(12) United States Patent
Scheirle et al.

(10) Patent No.: US 12,332,874 B2
(45) Date of Patent: *Jun. 17, 2025

(54) SYSTEM VERSIONED TABLE WITH TRANSACTIONAL SYSTEM TIME

(71) Applicant: SAP SE, Walldorf (DE)

(72) Inventors: Bernhard Scheirle, Leimen (DE); Andreas Tonder, Weinheim (DE); Carsten Thiel, Heidelberg (DE); Guenter Radestock, Karlsruhe (DE); Thomas Legler, Walldorf (DE); Martin Heidel, Walldorf (DE); Robert Schulze, Walldorf (DE); Joern Schmidt, Walldorf (DE); Rolando Blanco, Waterloo (CA)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/530,819

(22) Filed: Dec. 6, 2023

(65) Prior Publication Data

US 2024/0111757 A1 Apr. 4, 2024

Related U.S. Application Data

(63) Continuation of application No. 17/481,644, filed on Sep. 22, 2021, now Pat. No. 11,886,424.

(51) Int. Cl.
*G06F 16/00* (2019.01)
*G06F 16/23* (2019.01)

(52) U.S. Cl.
CPC ............... *G06F 16/2379* (2019.01)

(58) Field of Classification Search
CPC ............ G06F 16/2379; G06F 16/2365; G06F 16/2322; G06F 16/2329
USPC ......................................................... 707/703
See application file for complete search history.

(56) References Cited

U.S. PATENT DOCUMENTS

| | | | |
|---|---|---|---|
| 10,324,905 B1* | 6/2019 | Ross | G06F 16/23 |
| 2010/0114818 A1* | 5/2010 | Lier | G06F 16/20 |
| | | | 707/613 |
| 2012/0310934 A1* | 12/2012 | Peh | G06F 16/219 |
| | | | 707/736 |
| 2015/0169356 A1* | 6/2015 | Nagashima | H04L 67/1097 |
| | | | 709/203 |
| 2017/0046384 A1* | 2/2017 | Di Blas | G06F 16/24534 |
| 2018/0329967 A1* | 11/2018 | Lee | G06F 16/27 |
| 2022/0078292 A1* | 3/2022 | Nishiyama | G06K 15/4095 |

* cited by examiner

*Primary Examiner* — Incent F Boccio
(74) *Attorney, Agent, or Firm* — Mintz Levin Cohn Ferris Glovsky and Popeo, P.C.

(57) ABSTRACT

A method may include receiving a first transaction inserting a record into a database and a second transaction deleting the record from the database. A validity period for the record may be determined based on a first commit time at which the first transaction is committed and a second commit time at which the second transaction is committed. A current table and/or a history table of a system versioned table may be updated to include the record based on the validity period of the record. One or more temporal operations may be performed based on the system versioned table. For example, a time travel operation may be performed to retrieve, based on the system versioned table, one or more records that are valid at a given point in time. Related systems and computer program products are also provided.

19 Claims, 4 Drawing Sheets

SYSTEM VERSIONED TABLE WITH TRANSACTIONAL SYSTEM TIME

TECHNICAL FIELD

The subject matter described herein relates generally to database processing and more specifically to a system versioned table with transactional system time.

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, are provided for a system versioned table with transactional system time. In some example embodiments, there is provided a system that includes at least one processor and at least one memory. The at least one memory may include program code that provides operations when executed by the at least one processor. The operations may include: receiving a first transaction inserting a record into a database and a second transaction deleting the record from the database; determining, based at least on a first commit time at which the first transaction is committed and a second commit time at which the second transaction is committed, a validity period of the record; and updating, based at least on the validity period of the record, a current table and/or a history table of a system versioned table to include the record.

In some variations, one or more features disclosed herein including the following features can optionally be included in any feasible combination. The validity period may include a valid-from timestamp and a valid-to timestamp.

In some variations, the valid-from timestamp may correspond to the first commit time of the first transaction inserting the record. The valid-to timestamp may correspond to the second commit time of the second transaction deleting the record.

In some variations, the record may be stored in the current table during the validity period of the record.

In some variations, the record may be moved from the current table to the history table upon an expiration of the validity period.

In some variations, the record may be omitted from the history table in response to the first transaction and the second transaction being a same transaction.

In some variations, the validity period may be determined based on the first commit time of the first transaction and the second commit time of the second transaction instead of a first start time of the first transaction and/or a second start time of the second transaction.

In some variations, the operations may further include: performing, based at least on the system versioned table, a time travel operation by at least identifying one or more data records that are valid at a given point in time.

In some variations, the operations may further include: determining, based at least on the system versioned table, a version history of the record.

In some variations, the database may include an in-memory column-oriented relational database.

In another aspect, there is provided a method for a system versioned table with transactional system time. The method may include: receiving a first transaction inserting a record into a database and a second transaction deleting the record from the database; determining, based at least on a first commit time at which the first transaction is committed and a second commit time at which the second transaction is committed, a validity period of the record; and updating, based at least on the validity period of the record, a current table and/or a history table of a system versioned table to include the record.

In some variations, one or more features disclosed herein including the following features can optionally be included in any feasible combination. The validity period may include a valid-from timestamp and a valid-to timestamp.

In some variations, the valid-from timestamp may correspond to the first commit time of the first transaction inserting the record. The valid-to timestamp may correspond to the second commit time of the second transaction deleting the record.

In some variations, the record may be stored in the current table during the validity period of the record. The record may be removed from the current table to the history table upon an expiration of the validity period.

In some variations, the record may be omitted from the history table in response to the first transaction and the second transaction being a same transaction.

In some variations, the validity period may be determined based on the first commit time of the first transaction and the second commit time of the second transaction instead of a first start time of the first transaction and/or a second start time of the second transaction.

In some variations, the method may further include: performing, based at least on the system versioned table, a time travel operation by at least identifying one or more data records that are valid at a given point in time.

In some variations, the method may further include: determining, based at least on the system versioned table, a version history of the record.

In some variations, the database may include an in-memory column-oriented relational database.

In another aspect, there is provided a computer program product including a non-transitory computer readable medium storing instructions. The instructions may cause operations may executed by at least one data processor. The operations may include: receiving a first transaction inserting a record into a database and a second transaction deleting the record from the database; determining, based at least on a first commit time at which the first transaction is committed and a second commit time at which the second transaction is committed, a validity period of the record; and updating, based at least on the validity period of the record, a current table and/or a history table of a system versioned table to include the record.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a system versioned table with transactional system time, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
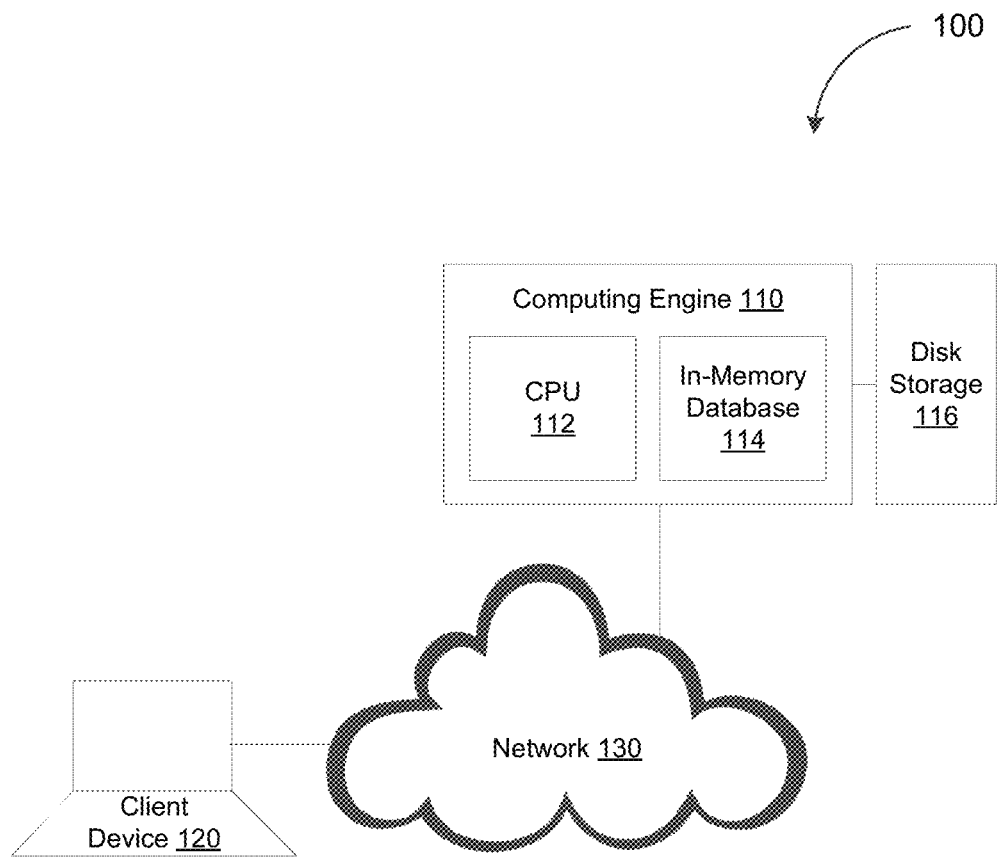
FIG. 1 depicts a system diagram illustrating an example of a database system, in accordance with some example embodiments.

An in-memory relational database may utilize main memory for the primary storage of database tables. In some cases, the in-memory relational database may be implemented as a column-oriented database (or a columnar database) that stores data from database tables by columns instead of by rows. As noted, the tuples of a relation may occupy the rows of a database table while the columns of the database table may store the values of the common attributes shared by the tuples. Thus, in the columnar database, the values occupying each column of the database table, which may span multiple rows (or tuples) of the database table, may be stored sequentially in one or more data pages, with each data page storing at least a portion of a column. The in-memory column-oriented relational database may support efficient data compression and partitioning for massively parallel processing. Moreover, because the in-memory database is directly accessible by the central processing unit (CPU) of the computing engine, transactions accessing the in-memory database may be executed to provide near-instantaneous results.

At least some of the transactions accessing the in-memory database may modify the data stored in the in-memory database, for example, by inserting and/or deleting one or more records (or one or more rows) in the database tables stored in the database. To track changes made to the database tables and provide rapid access to temporally correct versions of the records in the database, one or more system versioned tables may be maintained at the in-memory database in which each record is associated with a validity period defined by a valid-from timestamp and a valid-to timestamp. For example, a system versioned table may include a current table and a history table. The current table may contain records that are currently valid while the history table may contain records that are no longer valid (e.g., deleted records, previous versions of updated records, and/or the like). Whether a record is valid and should reside in the current table or invalid and should be moved from the current table to the history table may be determined based the validity period of the record.

In some example embodiments, the validity period of a record (or row) in a database table may be determined based on the transactional system times of the transactions that modified the record. For example, the validity period of the record may be defined by a valid-from timestamp corresponding to a first commit time of a first transaction inserting the record and a valid-to timestamp corresponding to a second commit time of a second transaction deleting the record. The valid-from timestamp defining the start of the validity period must not exceed the valid-to timestamp defining the end of the validity period. As such, the validity period of the record may be determined based on the commit times of the first transaction and the second transaction instead of the start times. Doing so may avoid certain anomalies such as when a first transaction inserting a first record starts before a second transaction inserting a second record but commits after the second transaction. If the validity period of the first record and the second record are determined based on the start time of the first transaction and a second transaction, a time travel operation to retrieve records that are valid at a given point in time may return inconsistent results. For instance, a time travel operation performed before the first transaction commits may return only the second record whereas a time travel operation performed after the first transaction commits may return the first record and the second record.

FIG. 1 depicts a system diagram illustrating an example of a database system 100, in accordance with some example embodiments. Referring to FIG. 1, the database system 100 may include a computing engine 110 with a central processing unit 112, an in-memory database 114, and a disk storage 116. The computing engine 110 may be communicatively coupled with a client device 120 via a network 130. The client device 120 may be a processor-based device including, for example, a mobile device, a wearable apparatus, a personal computer, a workstation, an Internet-of-Things (IoT) appliance, and/or the like. The network 130 may be a wired network and/or wireless network including, for example, a public land mobile network (PLMN), a local area network (LAN), a virtual local area network (VLAN), a wide area network (WAN), the Internet, and/or the like.

In some example embodiments, the in-memory database 114 may be a relational, column-oriented database that stores data from database tables by columns instead of by rows. As such, in the in-memory database 114, the tuples of a relation may occupy the rows of a database table while the columns of the database table may store the values of the common attributes shared by the tuples. Moreover, the values occupying each column of the database table, which may span multiple rows (or tuples) of the database table, may be stored sequentially in one or more data pages, with each data page storing at least a portion of a column. Because the in-memory database 114 is directly accessible by the central processing unit (CPU) 112 of the computing engine 110, transactions accessing the in-memory database 114 may be executed to provide near-instantaneous results.

At least some of the transactions accessing the in-memory database may modify the data stored in the in-memory database 114, for example, by inserting and/or deleting one or more records (or one or more rows) in the database tables stored in the in-memory database 114. To track changes made to the database tables and provide rapid access to temporally correct versions of the records in the in-memory database 114, one or more system versioned tables may be maintained at the in-memory database 114 in which each record is associated with a validity period defined by a valid-from timestamp and a valid-to timestamp. For example, a system versioned table may include a current table and a history table. The current table may contain records that are currently valid while the history table may contain records that are no longer valid (e.g., deleted records, previous versions of updated records, and/or the like). Records in the current table become invalid upon the expiration of their validity period and may be moved to the history table during execution of one or more data manipulation language (DML) statements.

Figure 2:
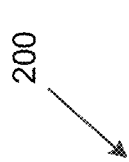
FIG. 2 depicts an example of a record, in accordance with some example embodiments.

Whether a record is valid and should reside in the current table or invalid and should be moved from the current table to the history table may be determined, for example, by the computing engine 110, based the validity period of the record. The validity period of a record (or row) in a database table may be determined based on the commit times of the transactions that modified the record. For example, the validity period of the record may be defined by a valid-from timestamp corresponding to a first commit time $t_1$ of a first transaction $TX_1$ inserting the record and a valid-to timestamp corresponding to a second commit time $t_2$ of a second transaction $TX_2$ deleting the record. To further illustrate, FIG. 2 depicts an example of a record 200, in accordance with some example embodiments. As shown in FIG. 2, the record 200 includes a VALID_FROM column including the valid-from timestamp associated with the record 200 and a VALID_TO column including the valid-to timestamp associated with the record 200. The VALID_FROM column and the VALID_TO column may be occupied by values having of the structure query language (SQL) type TIMESTAMP. Accordingly, in the example shown in FIG. 2, the record 200 may be valid from 2017-11-09 13:43:38 to 2017-11-09 13:43:50.

In some example embodiments, a system versioned table may enable the identification and/or retrieval of temporally correct versions of the record in the system versioned table. One example temporal operation is a time travel operation on an individual database table, which may include identifying and/or retrieving records that are valid at a given point in time. A system versioned table may also be used to determine the version history of one or more records included in the system versioned table. Furthermore, in some cases, values included in the valid-from column and valid-to column of the system versioned table may be accessed directly via one or more SQL statements.

The valid-from timestamp defining the start of the validity period may be required to not exceed the valid-to timestamp defining the end of the validity period. As such, the validity period of the record may be determined based on the first commit time $t_1$ of the first transaction $TX_1$ and the second commit time $t_2$ of the second transaction $TX_2$ instead of the start times to avoid the exception in which the first transaction $TX_1$ inserting the record starts before the second transaction $TX_2$ deleting the record but the first transaction commits after the second transaction. In this scenario, the validity period of the record may violate the requirement that the valid-from timestamp defining the start of the validity period not exceed the valid-to timestamp defining the end of the validity period. Moreover, determining the validity period of the record based on the start times of the first transaction $TX_1$ and the second transaction $TX_2$ may introduce inconsistencies in the results of time travel operations. For example, a time travel operation performed before the first transaction commits may fail to return the record even though the record has been inserted whereas a time travel operation performed before the second transaction commits may return the record despite the record having already been deleted.

Table 1 below depicts SQL syntax for creating a system versioned table with transactional system time, which may correspond to the commit times of the transactions that modified the records in the table. As shown in Table 1, the VALID_FROM column of the current table and the VALID_TO column of the history table are defined to include the commit times of the transactions modifying the corresponding records.

TABLE 1

- history table (used for storing the updated/deleted record versions)
create column table <historytablename>
(
<column definitions...>,
<validfrom_columnname> timestamp not null, -- row start
<validto_columnname> timestamp not null
generated always as row commit,
);
-- current table (for storing the most recent record versions)
create column table <tablename>
(
<column definitions...>,
<validfrom_columnname> timestamp not null generated
always as row start commit,
<validto_columnname> timestamp not null generated always as
row end, period for system_time (<validfrom_columnname>,
<validto_columnname>)
)
  with system versioning history table <historytablename>;

In some example embodiments, an existing table may be altered to include a commit time column. Table 2 depicts the SQL syntax for adding a commit time column to an existing table. In the event the table is already populated with data, the commit time column may be populated with timestamps during the committing of the corresponding data definition language (DDL) transactions.

TABLE 2 alter table <tablename> add (<columnname> timestamp NOT NULL generated always as row start commit);
alter table <tablename> add (<columnname> timestamp NOT NULL generated always as row commit);

An existing table may also be altered by converting a TIMESTAMP NOT NULL column in the table into a commit time column. Table 3 depicts the SQL syntax for converting the TIMESTAMP NOT NULL column of a table into a commit time column.

TABLE 3 alter table <tablename> alter (<columnname> timestamp NOT NULL generated always as row start commit);
alter table <tablename> alter (<columnname> timestamp NOT NULL generated always as row commit);

The values in the commit time columns may be populated during the committing of the corresponding transactions (e.g., data manipulation language (DML) statements). If a record is inserted and deleted by the same transaction, the deleted record is not added to the history table at least because the records whose validity period is defined by valid-from timestamps that equal the corresponding valid-to timestamps are not reachable by a time travel operation to retrieve records that are valid at a given point in time.

In some example embodiments, a SQL select operation on the row commit value of an uncommitted record may return an error value such as, for example, a maximal timestamp (e.g., "9999-12-31 23:59:59.9999999") and/or the like. Table 4 depicts the SQL syntax implementing the error response to a SQL select statement operating on the row commit value of an uncommitted record.

TABLE 4 create column table t
(
id int primary key,
c timestamp not null generated always as row commit
);
commit;
insert into t values (1);
select * from t;
-- > returns (1, '9999-12-31 23:59:59.9999999')
commit;
select * from t;
-- > returns (1, '<timestamp determined on commit>')

Figure 3:
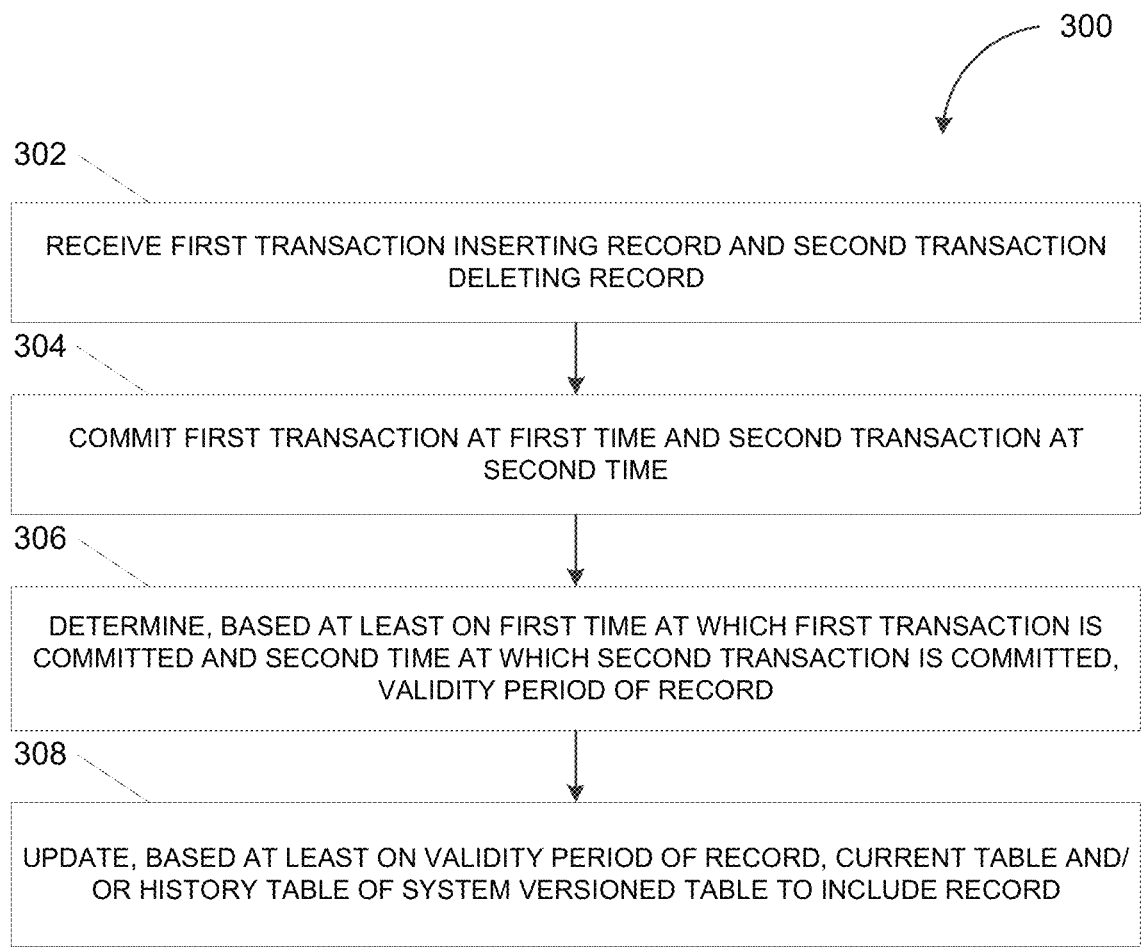
FIG. 3 depicts a flowchart illustrating an example of a process for system versioned table with transactional system time, in accordance with some example embodiments.

FIG. 3 depicts a flowchart illustrating an example of a process 300 for system versioned table with transactional system time, in accordance with some example embodiments, in accordance with some example embodiments. Referring to FIGS. 1-3, the process 300 may be performed by the computing engine 110 to maintain one or more system versioned tables at the in-memory database 114.

At 302, the computing engine 110 may receive a first transaction inserting a record and a second transaction deleting the record. For example, the computing engine 110 may receive a first transaction $TX_1$ inserting a record into the in-memory database 114. Furthermore, the computing engine 110 may receive a second transaction $TX_2$ deleting the record from the in-memory database 114.

At 304, the computing engine 110 may commit the first transaction at a first time and the second transaction at a second time. For example, the first transaction $TX_1$ may be committed at a first commit time $t_1$ and the second transaction $TX_2$ may be committed at a second commit time $t_2$.

At 306, the computing engine 110 may determine, based at least on the first time at which the first transaction is committed and the second time at which the second transaction is committed, a validity period of the record. In some example embodiments, the validity period of the record may be determined based on the first commit time $t_1$ of the first transaction $TX_1$ and the second commit time $t_2$ of the second transaction $TX_2$. The validity period may be determined based on the respective commit times of the first transaction $TX_1$ and the second transaction $TX_2$ instead of the start times to avoid exception in which the first transaction $TX_1$ inserting the record starts before the second transaction $TX_2$ deleting the record but the first transaction $TX_1$ commits after the second transaction $TX_2$. As noted, in the foregoing scenario, the validity period of the record may violate the requirement that the valid-from timestamp defining the start of the validity period not exceed the valid-to timestamp defining the end of the validity period.

At 308, the computing engine 110 may update, based at least on the validity period of the record, a current table and/or a history table of a system versioned table to include the record. In some example embodiments, whether the record is valid and should reside in the current table of a system versioned table or invalid and should be moved from the current table to the history table of the system versioned table may be determined based the validity period of the record. For example, the record may remain in the current table during the validity period of the record. Upon the expiration of the validity period, the record may be moved from the current table to the history table. For instance, the move from the current table to the history table may be performed during execution of one or more data manipulation language (DML) statements.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: receiving a first transaction inserting a record into a database and a second transaction deleting the record from the database; determining, based at least on a first commit time at which the first transaction is committed and a second commit time at which the second transaction is committed, a validity period of the record; and updating, based at least on the validity period of the record, a current table and/or a history table of a system versioned table to include the record.

Example 2: The system of example 1, wherein the validity period comprises a valid-from timestamp and a valid-to timestamp.

Example 3: The system of example 2, wherein the valid-from timestamp corresponds to the first commit time of the first transaction inserting the record, and wherein the valid-to timestamp corresponds to the second commit time of the second transaction deleting the record.

Example 4: The system of any one of examples 1-3, wherein the record is stored in the current table during the validity period of the record.

Example 5: The system of any one of examples 1-4, wherein the record is moved from the current table to the history table upon an expiration of the validity period.

Example 6: The system of any one of examples 1-5, wherein the record is omitted from the history table in response to the first transaction and the second transaction being a same transaction.

Example 7: The system of any one of examples 1-6, wherein the validity period is determined based on the first commit time of the first transaction and the second commit time of the second transaction instead of a first start time of the first transaction and/or a second start time of the second transaction.

Example 8: The system of any one of examples 1-7, wherein the operations further comprise: performing, based at least on the system versioned table, a time travel operation by at least identifying one or more data records that are valid at a given point in time.

Example 9: The system of any one of examples 1-8, wherein the operations further comprise: determining, based at least on the system versioned table, a version history of the record.

Example 10: The system of any one of examples 1-9, wherein the database comprises an in-memory column-oriented relational database.

Example 11: A method, comprising: receiving a first transaction inserting a record into a database and a second transaction deleting the record from the database; determining, based at least on a first commit time at which the first transaction is committed and a second commit time at which the second transaction is committed, a validity period of the record; and updating, based at least on the validity period of the record, a current table and/or a history table of a system versioned table to include the record.

Example 12: The method of example 11, wherein the validity period comprises a valid-from timestamp and a valid-to timestamp.

Example 13: The method of example 12, wherein the valid-from timestamp corresponds to the first commit time of the first transaction inserting the record, and wherein the valid-to timestamp corresponds to the second commit time of the second transaction deleting the record.

Example 14: The method of any one of examples 11-13, wherein the record is stored in the current table during the validity period of the record, and wherein the record is moved from the current table to the history table upon an expiration of the validity period.

Example 15: The method of any one of examples 11-14, wherein the record is omitted from the history table in response to the first transaction and the second transaction being a same transaction.

Example 16: The method of any one of examples 11-15, wherein the validity period is determined based on the first commit time of the first transaction and the second commit time of the second transaction instead of a first start time of the first transaction and/or a second start time of the second transaction.

Example 17: The method of any one of examples 11-16, wherein the operations further comprise: performing, based at least on the system versioned table, a time travel operation by at least identifying one or more data records that are valid at a given point in time.

Example 18: The method of any one of examples 11-17, wherein the operations further comprise: determining, based at least on the system versioned table, a version history of the record.

Example 19: The method of any one of examples 11-18, wherein the database comprises an in-memory column-oriented relational database.

Example 20: A non-transitory computer readable medium storing instructions, which when executed by at least one data processor, result in operations comprising: receiving a first transaction inserting a record into a database and a second transaction deleting the record from the database; determining, based at least on a first commit time at which the first transaction is committed and a second commit time at which the second transaction is committed, a validity period of the record; and updating, based at least on the validity period of the record, a current table and/or a history table of a system versioned table to include the record.

Figure 4:
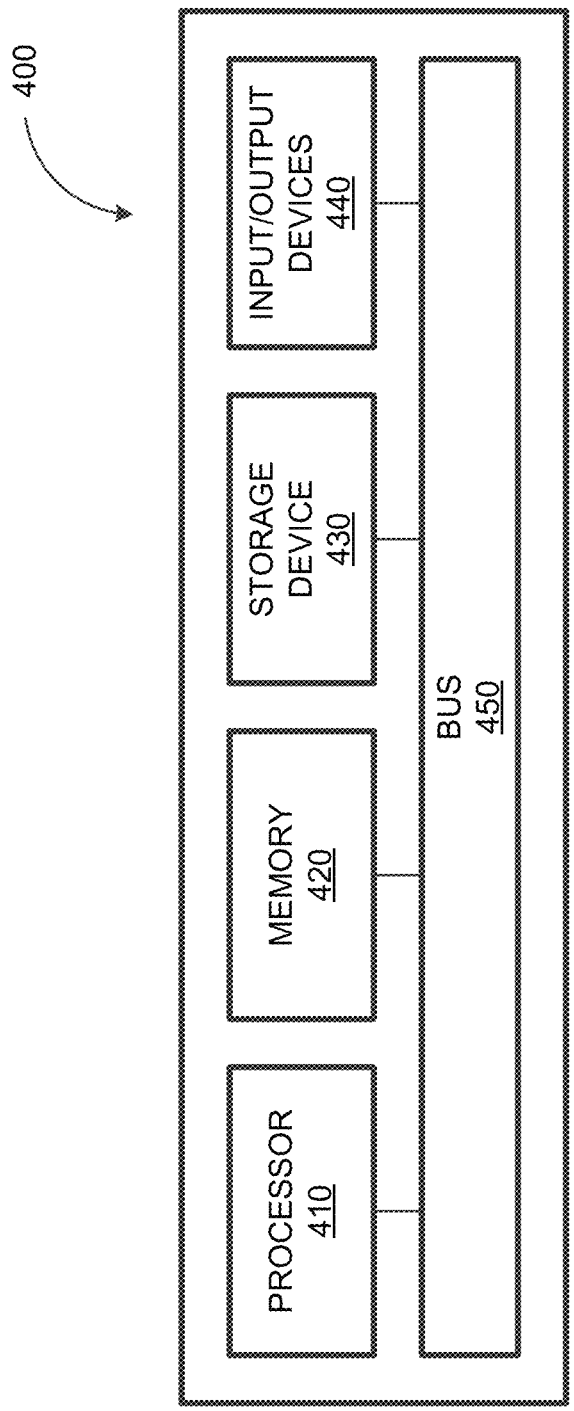
FIG. 4 depicts a block diagram illustrating an example of a computing system, in accordance with some example embodiments.

FIG. 4 depicts a block diagram illustrating an example of a computing system 400 consistent with implementations of the current subject matter. Referring to FIGS. 1-4, the computing system 400 may implement the computing engine 110 and/or any components therein.

As shown in FIG. 4, the computing system 400 can include a processor 410, a memory 420, a storage device 430, and input/output device 440. The processor 410, the memory 420, the storage device 430, and the input/output device 440 can be interconnected via a system bus 450. The processor 410 is capable of processing instructions for execution within the computing system 400. Such executed instructions can implement one or more components of, for example, the computing engine 110. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a floppy disk device, a hard disk device, an optical disk device, or a tape device, or other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    at least one data processor; and
    at least one memory storing instructions which, when executed by the at least one data processor, cause operations comprising:
        committing a first transaction at a first commit time and a second transaction at a second commit time, wherein the first transaction comprises inserting a record into a database and the second transaction comprises deleting the record from the database;
        determining, based at least on the first commit time at which the first transaction is committed and the second commit time at which the second transaction is committed, a validity period of the record; and
        updating, based at least on the validity period of the record, a current table and/or a history table of a system versioned table to include the record, wherein the record is moved from the current table to the history table upon an expiration of the validity period, wherein the record is moved from the current table to the history table upon an expiration of the validity period.

2. The system of claim 1, wherein the validity period comprises a valid-from timestamp and a valid-to timestamp.

3. The system of claim 2, wherein the valid-from timestamp corresponds to the first commit time of the first transaction inserting the record, and wherein the valid-to timestamp corresponds to the second commit time of the second transaction deleting the record.

4. The system of claim 1, wherein the record is stored in the current table during the validity period of the record.

5. The system of claim 1, wherein the record is omitted from the history table in response to the first transaction and the second transaction being a same transaction.

6. The system of claim 1, wherein the validity period is determined based on the first commit time of the first transaction and the second commit time of the second transaction instead of a first start time of the first transaction and/or a second start time of the second transaction.

7. The system of claim 1, wherein the operations further comprise:
performing, based at least on the system versioned table, a time travel operation by at least identifying one or more data records that are valid at a given point in time.

8. The system of claim 1, wherein the operations further comprise:
determining, based at least on the system versioned table, a version history of the record.

9. The system of claim 1, wherein the database comprises an in-memory column-oriented relational database.

10. A computer-implemented method, comprising:
committing a first transaction at a first commit time and a second transaction at a second commit time, wherein the first transaction comprises inserting a record into a database and the second transaction comprises deleting the record from the database;
determining, based at least on the first commit time at which the first transaction is committed and the second commit time at which the second transaction is committed, a validity period of the record; and
updating, based at least on the validity period of the record, a current table and/or a history table of a system versioned table to include the record, wherein the record is moved from the current table to the history table upon an expiration of the validity period, wherein the record is moved from the current table to the history table upon an expiration of the validity period.

11. The computer-implemented method of claim 10, wherein the validity period comprises a valid-from timestamp and a valid-to timestamp.

12. The computer-implemented method of claim 11, wherein the valid-from timestamp corresponds to the first commit time of the first transaction inserting the record, and wherein the valid-to timestamp corresponds to the second commit time of the second transaction deleting the record.

13. The computer-implemented method of claim 10, wherein the record is stored in the current table during the validity period of the record.

14. The computer-implemented method of claim 10, wherein the record is omitted from the history table in response to the first transaction and the second transaction being a same transaction.

15. The computer-implemented method of claim 10, wherein the validity period is determined based on the first commit time of the first transaction and the second commit time of the second transaction instead of a first start time of the first transaction and/or a second start time of the second transaction.

16. The computer-implemented method of claim 10, comprising:
performing, based at least on the system versioned table, a time travel operation by at least identifying one or more data records that are valid at a given point in time.

17. The computer-implemented method of claim 10, comprising:
determining, based at least on the system versioned table, a version history of the record.

18. The computer-implemented method of claim 10, wherein the database comprises an in-memory column-oriented relational database.

19. A non-transitory computer readable medium storing instructions, which when executed by at least one data processor, result in operations comprising:
committing a first transaction at a first commit time and a second transaction at a second commit time, wherein the first transaction comprises inserting a record into a database and the second transaction comprises deleting the record from the database;
determining, based at least on the first commit time at which the first transaction is committed and the second commit time at which the second transaction is committed, a validity period of the record; and
updating, based at least on the validity period of the record, a current table and/or a history table of a system versioned table to include the record, wherein the record is moved from the current table to the history table upon an expiration of the validity period, wherein the record is moved from the current table to the history table upon an expiration of the validity period.

* * * * *